United States Patent
Fendt

(10) Patent No.: US 10,618,515 B2
(45) Date of Patent: Apr. 14, 2020

(54) ANTICIPATORY CONTROL SYSTEM OF A MOTOR VEHICLE

(71) Applicant: Conti Temic microelectronic GmbH, Nürnberg (DE)

(72) Inventor: Günter Anton Fendt, Schrobenhausen (DE)

(73) Assignee: Conti Temic microelectronic GmbH, Nürnberg (DE)

(*) Notice: Subject to any disclaimer, the term of this patent is extended or adjusted under 35 U.S.C. 154(b) by 213 days.

(21) Appl. No.: 15/870,348

(22) Filed: Jan. 12, 2018

(65) Prior Publication Data
US 2018/0134287 A1 May 17, 2018

Related U.S. Application Data

(63) Continuation of application No. PCT/DE2016/200309, filed on Jul. 6, 2016.

(30) Foreign Application Priority Data

Jul. 15, 2015 (DE) .......... 10 2015 213 227

(51) Int. Cl.
*B60W 30/09* (2012.01)
*B60W 30/10* (2006.01)
(Continued)

(52) U.S. Cl.
CPC ........ *B60W 30/09* (2013.01); *B60W 30/0956* (2013.01); *B60W 30/10* (2013.01); *B60W 30/165* (2013.01); *B60W 40/04* (2013.01); *B60W 30/18163* (2013.01); *B60W 2550/10* (2013.01); *B60W 2550/20* (2013.01); *B60W 2550/30* (2013.01); *B60W 2710/207* (2013.01); *B60W 2720/10* (2013.01)

(58) Field of Classification Search
CPC .. B60W 30/09; B60W 40/04; B60W 2550/30; B60W 2550/10; B60W 30/10; B60W 30/165; B60W 30/0956; B60W 2720/10; B60W 2710/207; B60W 2550/20; B60W 30/18163
See application file for complete search history.

(56) References Cited

U.S. PATENT DOCUMENTS

2004/0088095 A1* 5/2004 Eberle .................... B60K 28/02
701/45
2014/0180569 A1 6/2014 Ueda et al.

FOREIGN PATENT DOCUMENTS

| DE | 102011103603 | 2/2012 |
|----|--------------|--------|
| DE | 102013210395 | 12/2014 |
| DE | 102013210923 | 12/2014 |

OTHER PUBLICATIONS

International Search Report and Written Opinion dated Oct. 26, 2016 from corresponding International Patent Application No. PCT/DE2016/200309.
(Continued)

*Primary Examiner* — Russell Frejd

(57) ABSTRACT

The disclosure relates to a control system and to a device for an ego-vehicle in a vehicle convoy in the case of the avoidance of an obstacle. Before the ego-vehicle follows an adopted avoidance trajectory of a vehicle driving in front, a hazard evaluation of the driving strategy of the vehicle driving in front is performed and the avoidance trajectory is modified on the basis of the result of the hazard evaluation.

10 Claims, 4 Drawing Sheets

(51) Int. Cl.
*B60W 30/095* (2012.01)
*B60W 30/165* (2020.01)
*B60W 40/04* (2006.01)
*B60W 30/18* (2012.01)

(56) References Cited

OTHER PUBLICATIONS

German Office Action dated Jan. 27, 2016 for corresponding German Patent Application No. 10 2015 213 227.7.

\* cited by examiner

ANTICIPATORY CONTROL SYSTEM OF A MOTOR VEHICLE

CROSS REFERENCE TO RELATED APPLICATION

This application claims the benefit of International application No. PCT/DE2016/200309, filed Jul. 6, 2016, which claims priority to German patent application No. 10 2015 213 227.7, filed Jul. 15, 2015, each of which is hereby incorporated by reference.

TECHNICAL FIELD

The technical field relates to a control system and to a device for an ego-vehicle in a vehicle convoy in the case of the avoidance of an obstacle.

BACKGROUND

Modern vehicles are increasingly being equipped with surroundings detecting driver assistance systems. Camera-based systems such as, for example, optical parking sensors, 360-degree all-round vision applications, lane departure warning (LDW), ACC systems, distance warning systems (radar, lidar), pre-crash sensor technology and the like therefore now form part of the special equipment of vehicles. The information regarding the surroundings of the vehicle captured by these devices can be used for additional functions.

DE 10 2011 103 603 A1 discloses a synchronous overtaking maneuver, in which a second vehicle follows a first vehicle when overtaking a vehicle driving slowly. If the view is restricted, the second vehicle slows down instead of following the first vehicle, in order to have a better view forwards and to assess the hazard posed by the oncoming traffic.

DE 10 2013 210 395 A1 shows a method for data communication which takes place between a plurality of vehicles, on the one hand, and a central pool of information external to the vehicle, on the other hand, wherein the vehicles each have an automatic driving mode in which the respective vehicle is autonomously guided longitudinally and transversely by means of a control device of the vehicle, wherein data is transmitted by the plurality of vehicles to the central pool of information, which contains information about the switching on of the automatic driving mode as well as a switching-on location of the driving mode, and/or information about the switching off of the automatic driving mode as well as a switching-off location of the driving mode on the respective vehicle.

As such, it is desirable to present a system and a method to increase safety in the case of the avoidance of obstacles. In addition, other desirable features and characteristics will become apparent from the subsequent summary and detailed description, and the appended claims, taken in conjunction with the accompanying drawings and this background.

SUMMARY

A method for controlling an ego-vehicle includes: determining an ego driving strategy as a function of the surroundings; detecting a driving strategy of a vehicle driving in front; comparing the ego driving strategy with the driving strategy of the vehicle driving in front; adopting the driving strategy of the vehicle driving in front in the event of a deviation of the ego driving strategy from the driving strategy of the vehicle driving in front; performing the hazard evaluation of the driving strategy of the vehicle driving in front; modifying the adopted driving strategy if the vehicle driving in front makes an avoiding maneuver onto the other lane and the hazard evaluation is unreliable, wherein the ego-vehicle speed is reduced, the hazard evaluation of the adopted and modified driving strategy is performed again, and the ego-vehicle is controlled as a function of the hazard evaluation in accordance with the modified driving strategy or an emergency strategy.

The driving strategy may utilize a following or avoidance trajectory. The possible risk of collision with the oncoming traffic can also advantageously be taken into account during the selection/stipulation of the avoidance trajectory, in particular associated with the proviso that, as a result, no increased/increasing accident risk for the following traffic is generated by the system behavior of the ego-vehicle. In particular, by following an emergency strategy such as, for example, full braking, the risk for the vehicle can be reduced if it has not been possible to perform an adequate hazard evaluation.

The deviation may be caused by an obstacle. A collision with the obstacle and the oncoming traffic is therefore advantageously avoided.

In another exemplary configuration, the hazard evaluation may be adversely affected by the dimensions of the vehicle driving in front. The scale of the vehicle driving in front is advantageously taken into account. In particular, the hazard can thus be better estimated by following a SUV or a truck.

The ego driving strategy may be modified by a steering or braking intervention. An intervention is thus advantageously made in the movement of the vehicle and an accident can be prevented.

In another exemplary configuration, the detecting of a driving strategy of a vehicle driving in front may comprise an avoidance maneuver of the vehicle driving in front. A risk which is posed, for example by an obstacle, is advantageously recognized early on as a result of the behavior of the vehicle driving in front, and measures can then be taken as a precaution to increase the active or passive safety.

The ego driving strategy and the driving strategy of the vehicle driving in front may include a tracking. The vehicle driving in front can be advantageously followed in the event of a lane change without being exposed to a hazard posed by the oncoming traffic.

The term "tracking" with respect to the motor vehicle driving in front is to be understood, in the light of the disclosure, to mean that the ego-vehicle follows the vehicle driving in front in a substantially consistent manner, but does not match it exactly with respect to the lane and the speed. Rather, the sum of the lateral offset (i.e., deviation from the original driving trajectory—transverse displacement in the longitudinal direction of the vehicle)—which is produced as a consequence of the following strategy—has priority.

The ego-vehicle can more preferably stay in its lane as a function of the hazard evaluation. Advantageously, the vehicle does not leave its own lane and is therefore not exposed to the risk of colliding with the oncoming traffic.

In another advantageous embodiment, if no result is available from the hazard evaluation, the initially identical tracking with respect to the motor vehicle driving in front is only continued in the ego-vehicle until such time as the ego-vehicle does not leave its own lane.

The driving trajectory with respect to the vehicle driving in front is then advantageously altered for a short period of time (prior to departure from its own lane) in such a way that the ego-vehicle does not leave its own lane or does not make use of the opposite lane.

In another configuration, the hazard evaluation can be insufficient if the view of the opposite lane is restricted. Advantageously, the vehicle does not rely on the hazard evaluation if the opposite lane cannot be viewed, for example because of a curve or a crest of a hill.

The hazard evaluation can preferably take account of the relative speed and/or the distance between the ego-vehicle and an oncoming vehicle on the opposite lane. The hazard evaluation therefore advantageously estimates the overtaking distance and takes account of the time available for the overtaking maneuver.

According to one exemplary embodiment, a device for controlling an ego-vehicle has an environment detection system for capturing information regarding the surroundings of an ego-vehicle, a recognition unit for recognizing a driving strategy of a vehicle driving in front, a control unit for controlling the ego-vehicle, and a unit for performing the method described above.

The environment detection system or the recognition unit can advantageously use information from sensor technology or a sensor system of an assistance system. More advantageously, the control unit can override the driver or be overridden by the driver.

Further advantages, features and possible applications of the present disclosure are set out in the following description in conjunction with the embodiment examples shown in FIGS. 1 to 4. In this case, all of the features described and/or depicted, whether in their own right or in any combination, form the subject-matter or the method respectively, including independently of their summary in the claims or their references.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
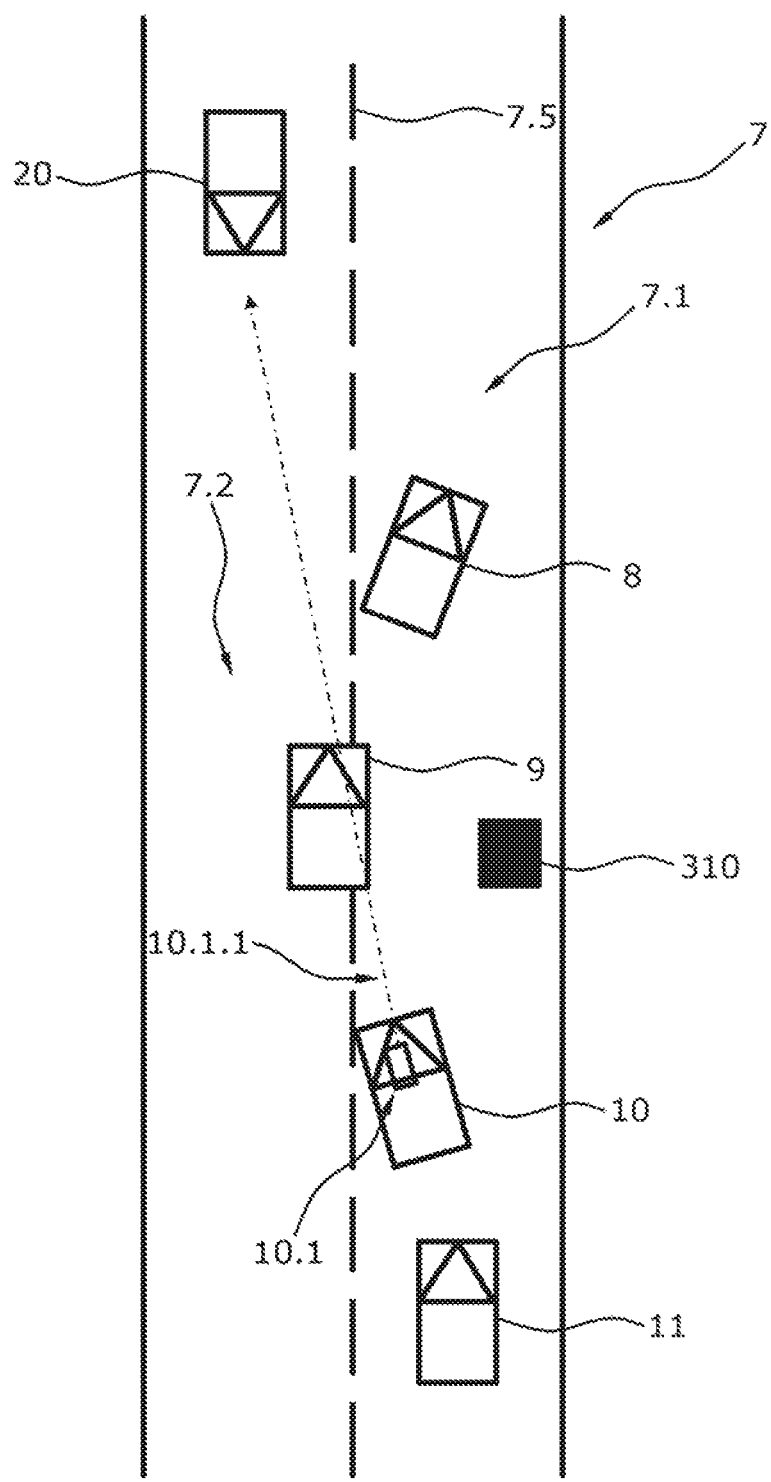
FIG. 1 shows a schematic diagram of an exemplary traffic scenario.

FIG. 1 shows an exemplary traffic situation for avoiding an obstacle 310. The vehicle driving in front 9 of the ego-vehicle 10 avoids an obstacle 310 and therefore has to change its trajectory into an avoidance trajectory. The avoidance trajectory of the vehicle driving in front 9 therefore deviates from the previous following trajectory of the ego-vehicle 10. The ego-vehicle adopts the avoidance trajectory of the vehicle driving in front 9 and performs a hazard evaluation. The view 10.1.1 of the opposite lane 7.2 is concealed by the vehicle driving in front 9 such that the hazard evaluation is insufficient.

It is only possible to safely adopt the avoidance trajectory of the vehicle driving in front 9 as long as there is no oncoming traffic 20 in the opposite lane 7.2, or the avoidance trajectory does not make it necessary to drive at least partially on the opposite lane 7.2.

Figure 2:
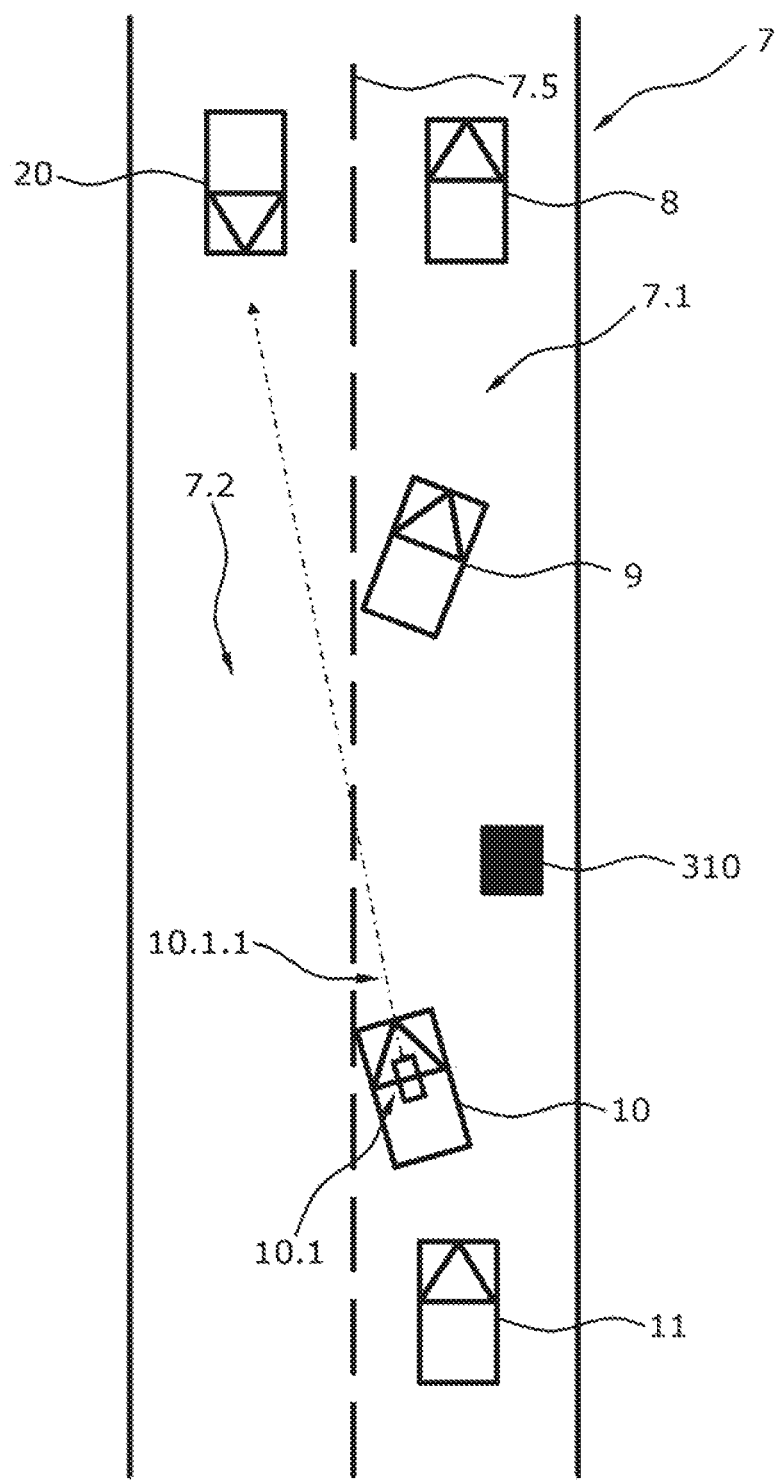
FIG. 2 shows a schematic diagram of the further course of the exemplary traffic scenario shown in FIG. 1.

FIG. 2 shows the further course of the traffic situation shown in FIG. 1. Before the ego-vehicle 10 automatically follows the avoidance trajectory, the ego-vehicle 10 is decelerated so that the distance from the vehicle driving in front 9 is increased and therefore the ego-vehicle 10 has a sufficient view 10.1.1 of the opposite lane 7.2. The hazard evaluation can then reliably evaluate the traffic situation and, for example, recognize an oncoming vehicle 20.

Figure 3:
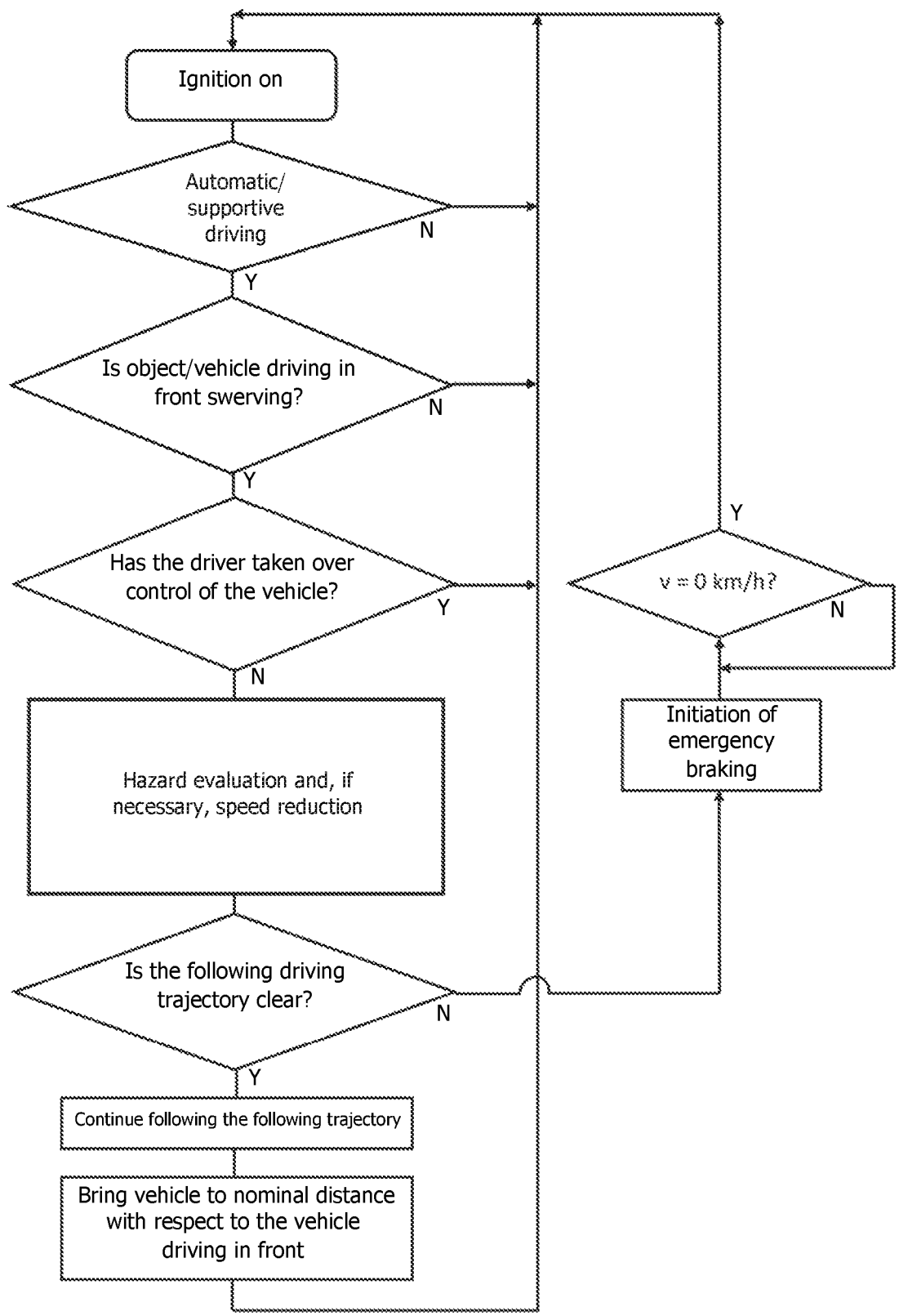
FIG. 3 shows a schematic diagram of a flow chart regarding the decision-making according to one exemplary embodiment.

FIG. 3 shows a schematic diagram of a flow chart regarding the decision-making. The method, according to one exemplary embodiment, starts with a monitoring of the driving corridor in front of the ego-vehicle utilizing a system for monitoring the surroundings after the ego-vehicle has been set in motion or started (ignition ON).

In the next step, which is merely optional, a check is carried out to see whether the ego-vehicle is being operated automatically or with support.

In the next step, the trajectory of the vehicle driving in front is monitored with the aid of the surroundings monitoring system and a change in this trajectory, for example, to an avoidance trajectory, is recognized.

In the next optional step, a check is carried out to ascertain whether control of the ego-vehicle has been taken over by the vehicle operator. It is possible to install an override by the driver here. However, it is also possible to ignore the override by the driver if this would make it possible to prevent an accident.

In the event of an unreliable hazard evaluation, the speed of the ego-vehicle is reduced by the assistance system such that the distance from the vehicle driving in front is increased and, consequently, the surroundings detection system can view the opposite lane without any restrictions.

The next step involves checking whether the hazard evaluation is sufficient for driving on the opposite lane, since the following trajectory makes it necessary, for example, to drive on the opposite lane at least in part.

If the hazard evaluation for the following trajectory (e.g., driving on the opposite lane) is adequate and does not pose a risk for the ego-vehicle, the ego-vehicle follows the vehicle driving in front and re-establishes the nominal distance from the vehicle driving in front.

If, on the other hand, the following trajectory cannot be carried out safely for the ego-vehicle, an emergency strategy, for example emergency braking, is initiated or another avoidance trajectory is sought until the ego-vehicle is brought to a halt or the obstacle has been passed.

Figure 4:
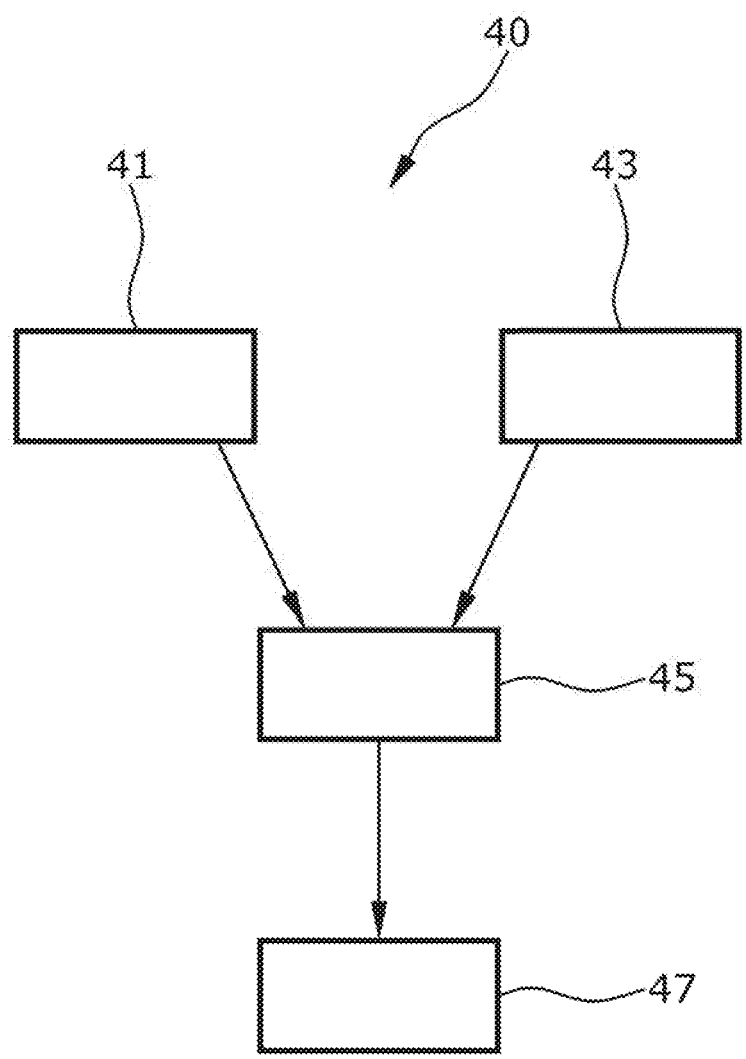
FIG. 4 shows a device for controlling the ego-vehicle according to one exemplary embodiment.

FIG. 4 shows a device 40 for controlling an ego-vehicle according to one exemplary embodiment. An environment detection system 41 captures information regarding the surroundings of the ego-vehicle, a recognition unit 43 recognizes a driving strategy of a vehicle driving in front. A unit 45 uses the information of the environment detection system 41 and of the recognition unit 43 in order to perform the method described in the above figures, wherein the ego-vehicle is controlled by a control unit 47 which uses the information of the unit 45.

The present disclosure has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for controlling an ego-vehicle, comprising:
   determining an ego driving strategy as a function of the surroundings;
   detecting a driving strategy of a vehicle driving in front;
   comparing the ego driving strategy with the driving strategy of the vehicle driving in front;
   adopting the driving strategy of the vehicle driving in front in the event of a deviation of the ego driving strategy from the driving strategy of the vehicle driving in front;
   performing the hazard evaluation of the driving strategy of the vehicle driving in front;
   modifying the adopted driving strategy if the vehicle driving in front makes an avoiding maneuver onto the other lane and the hazard evaluation is unreliable, wherein
   the ego-vehicle speed is reduced,
   the hazard evaluation of the adopted and modified driving strategy is performed again, and
   the ego-vehicle is controlled as a function of the hazard evaluation in accordance with the modified driving strategy or an emergency strategy.

2. The method according to claim 1, wherein the deviation is caused by an obstacle.

3. The method according to claim 1, wherein the hazard evaluation is adversely affected by the dimensions of the vehicle driving in front.

4. The method according to claim 1, wherein the ego driving strategy is modified by a steering or braking intervention.

5. The method according to claim 1, wherein the detecting of a driving strategy of a vehicle driving in front comprises an avoidance maneuver of the vehicle driving in front.

6. The method according to claim 1, wherein the ego driving strategy and the driving strategy of the vehicle driving in front comprise a tracking.

7. The method according to claim 1, wherein the ego-vehicle stays in its lane as a function of the hazard evaluation.

8. The method according to claim 1, wherein the hazard evaluation is insufficient if the view of an opposite lane is restricted.

9. The method according to claim 1, wherein the hazard evaluation takes account of the relative speed and/or the distance between the ego-vehicle and an oncoming vehicle in an opposite lane.

10. A device for controlling an ego-vehicle, comprising:
    an environment detection system configured to capture information regarding surroundings of the ego-vehicle;
    a recognition unit for recognizing a driving strategy of a vehicle driving in front;
    a control unit for controlling the ego-vehicle, said control unit comprising instructions to:
    determine an ego driving strategy as a function of the surroundings;
    compare the ego driving strategy with the driving strategy of the vehicle driving in front;
    adopt the driving strategy of the vehicle driving in front in the event of a deviation of the ego driving strategy from the driving strategy of the vehicle driving in front;
    perform the hazard evaluation of the driving strategy of the vehicle driving in front;
    modify the adopted driving strategy if the vehicle driving in front makes an avoiding maneuver onto the other lane and the hazard evaluation is unreliable, wherein
    the ego-vehicle speed is reduced,
    the hazard evaluation of the adopted and modified driving strategy is performed again, and
    the ego-vehicle is controlled as a function of the hazard evaluation in accordance with the modified driving strategy or an emergency strategy.

* * * * *